United States Patent
Matsui et al.

(10) Patent No.: US 7,002,718 B2
(45) Date of Patent: Feb. 21, 2006

(54) OPTICAL DEFLECTION DEVICE, IMAGE PRINTING APPARATUS, AND OPTICAL DEFLECTION DEVICE MANUFACTURING METHOD

(75) Inventors: Susumu Matsui, Tokyo (JP); Naohiro Oono, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 10/802,469

(22) Filed: Mar. 17, 2004

(65) Prior Publication Data

US 2004/0240022 A1   Dec. 2, 2004

(30) Foreign Application Priority Data

May 29, 2003   (JP) .............................. 2003-152336

(51) Int. Cl.
*G02B 26/08* (2006.01)

(52) U.S. Cl. .................................................... 359/216

(58) Field of Classification Search ........ 359/216–218, 359/212
See application file for complete search history.

(56) References Cited

U.S. PATENT DOCUMENTS 5,716,036 A * 2/1998 Isobe et al. ................. 359/216

FOREIGN PATENT DOCUMENTS

JP   2002-048997   2/2002

* cited by examiner

*Primary Examiner*—Euncha P. Cherry
(74) *Attorney, Agent, or Firm*—Lucas & Mercanti LLP

(57) ABSTRACT

This invention relates to an optical deflection device capable of obtaining sufficient durability without any positional error of a polygon mirror even when the rotational speed of the polygon mirror increases to 50,000 rpm or more. An optical deflection device includes a base member, a polygon mirror which is formed into a regular polygon and has a reflecting surface on each peripheral end face, a flange member which holds the polygon mirror and rotates with respect to the base member, and a press member which presses the polygon mirror against the flange member. In this optical deflection device, surface roughening is performed for at least one of the holding surface of the flange member which holds the polygon mirror and the held surface of the polygon mirror which is held by the holding surface, and the holding surface and held surface are bonded with an adhesive.

14 Claims, 2 Drawing Sheets

OPTICAL DEFLECTION DEVICE, IMAGE PRINTING APPARATUS, AND OPTICAL DEFLECTION DEVICE MANUFACTURING METHOD

BACKGROUND OF THE INVENTION

1. Field of the Invention

The present invention relates to an optical deflection device which can be preferably adopted in, e.g., a barcode reader or an image printing apparatus such as a digital copying machine, a printer, a facsimile apparatus, or a multifunction apparatus having the functions of these apparatuses, an image printing apparatus having the optical deflection device, and an optical deflection device manufacturing method.

2. Description of the Prior Art

An image printing apparatus or the like emits on the basis of read information a laser beam to a polygon mirror which rotates at high speed in an optical deflection device, scans a reflected beam to project it on a photosensitive body, and prints an image. Optical deflection devices using a polygon mirror are disclosed in many Japanese patent publications. One example is an optical deflection device shown in FIG. 1 (see, e.g., Japanese Unexamined Patent Publication No. 2002-48997).

An optical deflection device disclosed in this reference will be explained with reference to FIG. 1.

A polygon mirror 72 on which a reflecting surface 72a for reflecting and deflecting a laser beam is formed on a peripheral end face having a regular polygonal shape is fitted on a flange member 71 assembled integrally with an external cylinder bearing 73. The polygon mirror 72 is pressed and biased against the flange member 71 by a leaf spring 74 supported by a press plate 75, and is integrally held by the flange member 71. In this manner, a mirror unit 70 is formed.

An internal cylinder bearing 65 which is radially fitted in the external cylinder bearing 73, and an upper thrust bearing 66' and lower thrust bearing 64 which abut against the external cylinder bearing 73 in the thrust direction are fitted on, a base member 60. The internal cylinder bearing 65, upper thrust bearing 66, and lower thrust bearing 64 are positioned in the thrust direction by a screw 68 and stationary plate 67.

A stationary yoke 61 is fixed to the base member 60, and a printed wiring board 63 having a magnet coil 62 is further fixed. A magnet 77 which faces the magnet coil 62 is fixed to the flange member 71. When the magnet coil 62 is energized, the mirror unit 70 is permitted to rotate at high speed above the base member 60 via the bearings by the interaction between the magnet coil 62 and the magnet 77.

The polygon mirror 72 is held by a holding surface 71c of the flange member 71 via a held surface 72b (processing reference surface).

To correct the face tangle angle of the reflecting surface 72a of the polygon mirror 72 to a desired value, the held surface 72b must be processed at high precision. The holding surface 71c and held surface 72b are conventionally so machined as to obtain mirror surfaces with a surface roughness (Ry) of 1 μm or less. When the mirror-finish holding surface 71c and held surface 72b abut against each other to fix the polygon mirror 72 and flange member 71, the polygon mirror 72 has a positional error due to the centrifugal force of high-speed rotation. As a result of rotating the mirror unit 70 in this state, the balance may be lost to generate vibrations.

To prevent this, the above-mentioned reference employs surface treatment for one or both of the holding surface 71c and held surface 72b so as to adjust the surface roughness (Ry) to $3\ \mu m \leq Ry \leq 20\ \mu m$. Note that Ry is the maximum height of undulations formed on the surface, and is defined by JIS B0601. With this arrangement, even if centrifugal force acts on the polygon mirror 72 which rotates at high speed, the polygon mirror 72 can hardly have a positional error and does not unnecessarily vibrate because of frictional force generated between the holding surface 71c and the held surface 72b.

Recently, higher speed and higher precision of image printing are required more and more. For this purpose, the polygon mirror must also rotate at higher speed. Even if the rotational speed of the polygon mirror increases to 50,000 to 60,000 rpm, the polygon mirror must have satisfactory durability without any positional error.

Examinations made by the present inventor reveal that the invention described in the above reference can prevent a positional error of the polygon mirror when the rotational speed of the polygon mirror is up to about 50,000 rpm, but when the rotational speed exceeds 50,000 rpm, the polygon mirror may have a positional error.

SUMMARY OF THE INVENTION

The present invention has been made to overcome the conventional drawbacks, and has as its object to provide an optical deflection device capable of obtaining sufficient durability without any positional error of a polygon mirror even when the rotational speed of the polygon mirror increases to 50,000 rpm or more, an image printing apparatus, and an optical deflection device manufacturing method.

To achieve the above object, the first aspect of the present invention provides an optical deflection device comprising a base member, a polygon mirror which is formed into a regular polygon and has a reflecting surface on each peripheral end face, a flange member which holds the polygon mirror and rotates with respect to the base member, and a press member which presses the polygon mirror against the flange member, wherein surface roughening is performed for at least one of a holding surface of the flange member which holds the polygon mirror and a held surface of the polygon mirror which is held by the holding surface, and the holding surface and the held surface are bonded with an adhesive.

The second aspect of the present invention provides an optical deflection device wherein the surface roughening described in the first aspect includes abrasive blasting.

The third aspect of the present invention provides an optical deflection device described in the first aspect wherein a surface roughness (Ry) of the holding surface and/or the held surface having undergone surface roughening satisfies a conditional expression: $3\ \mu m \leq Ry \leq 20\ \mu m$ (where Ry: maximum height (JIS B0601)).

The fourth aspect of the present invention provides an optical deflection device wherein the adhesive described in the first aspect has a Young's modulus of not more than 1,700 MPa and preferably not more than 1,144 MPa at 25° C.

The fifth aspect of the present invention provides an optical deflection device wherein the polygon mirror described in the first aspect is rotated at a rotational speed of not less than 50,000 rpm.

The sixth aspect of the present invention provides an image printing apparatus comprising the optical deflection device described in the first aspect.

The seventh aspect of the present invention provides an optical deflection device wherein the polygon mirror and the flange member described in the first aspect are formed from aluminum.

The eighth aspect of the present invention provides an optical deflection device manufacturing method comprising the steps of integrally fitting a flange member on a bearing, performing flat work for a holding surface of the flange member arranged to hold a polygon mirror having a plurality of reflecting surfaces so as to become a surface perpendicular to an axis of rotation of the bearing, performing surface roughening for the holding surface of the flange member, applying an adhesive between the holding surface of the flange member and a held surface of the polygon mirror held by the holding surface, and mounting a press member which presses and biases the polygon mirror against the flange member.

The ninth aspect of the present invention provides an optical deflection device manufacturing method wherein the surface roughening described in the eighth aspect includes abrasive blasting.

The 10th aspect of the present invention provides a manufacturing method for an optical deflection device described in the eighth aspect wherein a surface roughness Ry of the holding surface having undergone surface roughening satisfies a conditional expression: $3 \ \mu m \leq Ry \leq 20 \ \mu m$ (where Ry: maximum height (JIS B0601)).

The 11th aspect of the present invention provides an optical deflection device manufacturing method wherein the adhesive described in the eighth aspect has a Young's modulus of not-more than 1,700 MPa and preferably not more than 1,144 MPa at 25° C.

The 12th aspect of the present invention provides an optical deflection device manufacturing method wherein the polygon mirror described in the eighth aspect is rotated at a rotational speed of not less than 50,000 rpm.

As is apparent from the above aspects, the optical deflection device, image printing apparatus, and optical deflection device manufacturing method according to the present invention can prevent the positional error of a polygon mirror and obtain sufficient durability even when the polygon mirror is rotated at a very high speed of 50,000 rpm or more.

The above and many other objects, features and advantages of the present invention will become manifest to those skilled in the art upon making reference to the following detailed description and accompanying drawings in which a preferred embodiment incorporating the principle of the present invention is shown by way of illustrative examples.

DETAILED DESCRIPTION OF THE PREFERRED EMBODIMENT

An embodiment of a beam scanning optical apparatus having an optical deflection device will be described with reference to FIG. 2.

Figure 1:
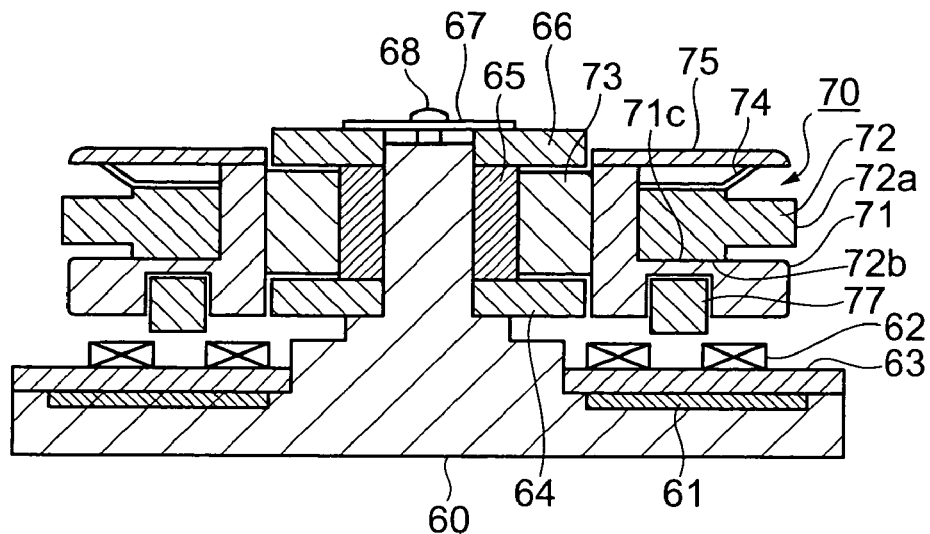
FIG. 1 is a longitudinal sectional view showing a conventional optical deflection device.
Figure 2:
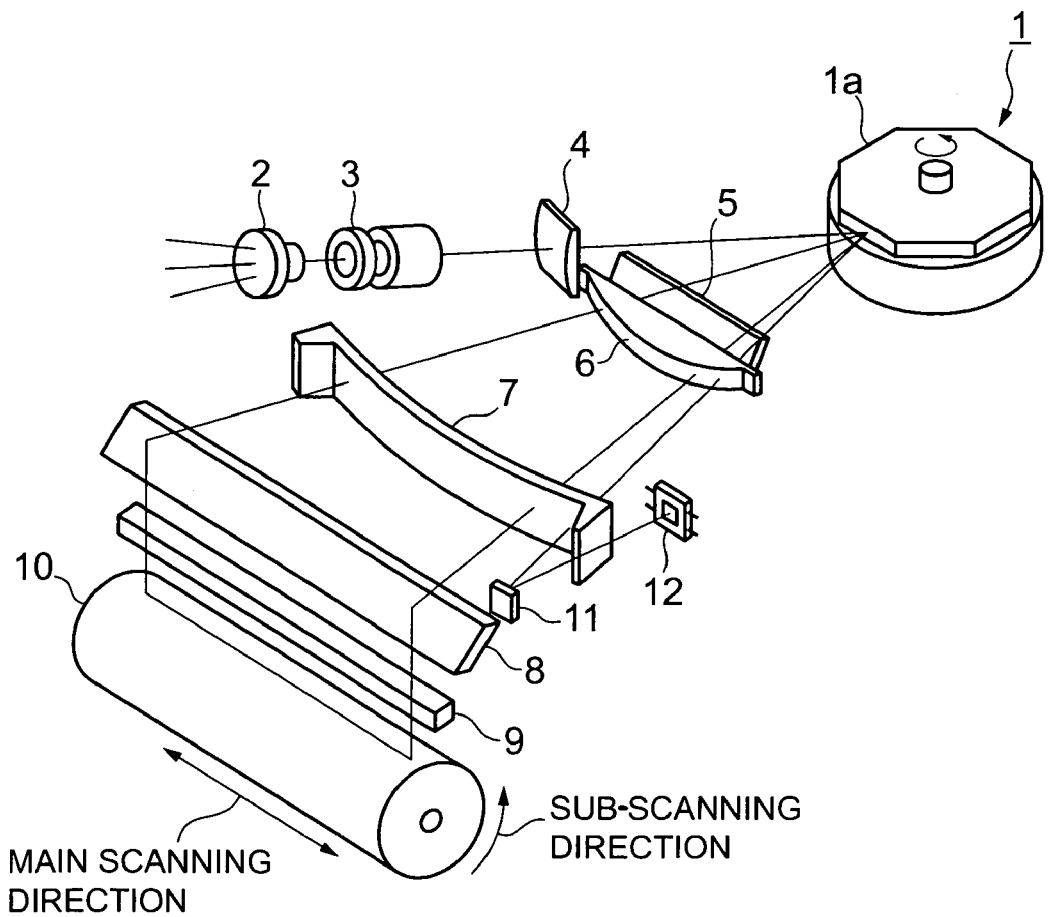
FIG. 2 is a perspective view showing a beam scanning optical apparatus having an optical deflection device.

In FIG. 2, reference numeral 1 denotes an optical deflection device having a polygon mirror 1a; 2, a semiconductor laser; 3, a collimator lens for a beam shaping optical system; 4, a first cylindrical lens; 5 and 6, f-θ lenses; 7, a second cylindrical lens; 8, a mirror; 9, a cover glass; and 10, a photosensitive drum. Reference numeral 11 denotes an index mirror for detecting synchronization; and 12, an index sensor for detecting synchronization.

A beam emitted by the semiconductor laser 2 is collimated into parallel light via the collimator lens 3. Parallel light passes through the first cylindrical lens 4 of the first imaging optical system, and impinges on the reflecting surface of the polygon mirror 1a which-rotates at high uniform speed in the optical deflection device 1. Light reflected by the reflecting surface of the polygon mirror 1a passes through the second imaging optical system comprised of the f-θ lenses 5 and 6 and second cylindrical lens 7. Light reaches the outer surface of the photosensitive drum 10 via the mirror 8 and cover glass 9. Main scanning of reflected light is done at a predetermined spot diameter on the outer surface of the photosensitive drum 10.

Fine adjustment is performed by an adjustment mechanism (not shown) in the main scanning direction. Sync detection for each line is executed by emitting a beam before the start of scanning to the index sensor 12 via the index mirror 11.

To obtain a high-quality latent image on the photosensitive drum 10 in the beam scanning optical apparatus, the polygon mirror 1a must be shaped into a regular polygon, have a plurality of high-precision reflecting surfaces, and rotate at high speed without any inclination from the axis of rotation and any positional error along the axis of rotation.

Figure 3:
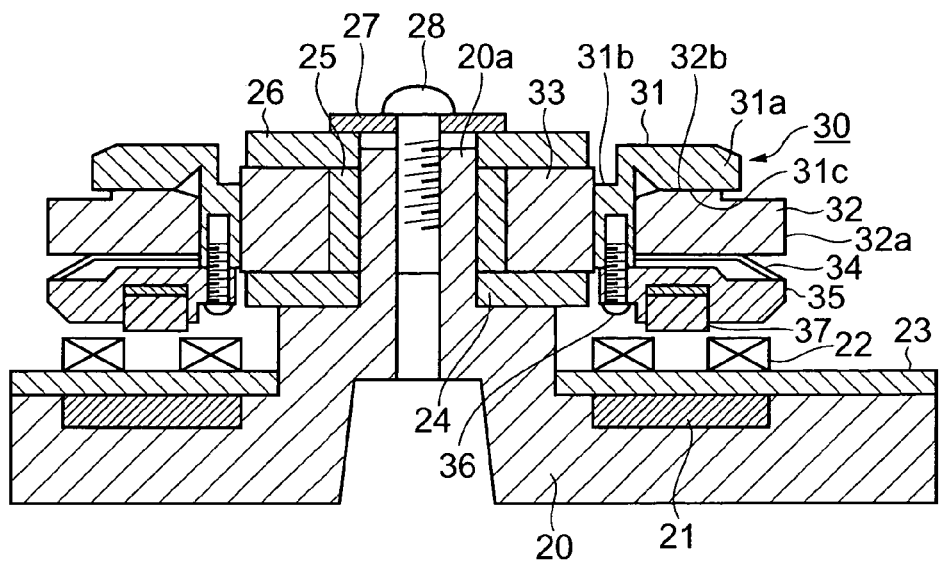
FIG. 3 is a longitudinal sectional view showing the optical deflection device.

The optical deflection device mounted in the beam scanning optical apparatus will be explained in detail with reference to FIG. 3. FIG. 3 is a longitudinal sectional view showing the optical deflection device.

Reference numeral 20 denotes a base member which is formed of a metal such as aluminum, holds each member (to be described below), and is fixed to the beam scanning optical apparatus. A stationary yoke 21 is buried in the upper surface of the base member 20 such that the upper surface of the stationary yoke 21 becomes flush with the upper surface of the base member 20. A printed wiring board 23 on which a plurality of magnet coils 22 are arranged within the same plane is further fixed to the upper surface of the base member 20.

Reference numeral 31 denotes a flange member which is formed of aluminum, brass, stainless steel, or the like, and comprised of a disk-like flange 31a and cylindrical portion 31b. The lower surface of the flange 31a is formed into a holding surface 31c for holding a polygon mirror 32. An external cylinder bearing 33 of a mirror unit 30 is integrally fitted by shrink fitting or press fitting in a hole formed at the center of the cylindrical portion 31b of the flange member 31.

The polygon mirror 32 is formed of a metal such as aluminum into a high-precision regular polygon. A reflecting surface 32a for reflecting and deflecting a laser beam is formed on each peripheral end face. The polygon mirror 32 is fitted around the cylindrical portion 31b of the flange member 31. A held surface 32b of the polygon mirror 32 is abutted against the holding surface 31c. The held surface 32b of the polygon mirror 32 serves as a reference surface used to process the reflecting surface 32a, and is mirror-finish.

A leaf spring (press member) 34 formed by press work of a stainless steel sheet, phosphor bronze steel sheet, or beryllium steel sheet is fitted on the cylindrical portion 31b. A mirror press plate 35 is fastened and fixed to the cylindrical portion 31b of the flange member 31 by a machine screw 36 so as to press the press member 34 against the lower surface of the polygon mirror 32. The leaf spring 34 presses the polygon mirror 32, and the held surface 32b of the polygon mirror 32 is pressed against the holding surface 31c of the flange member 31. This can prevent deformation of the polygon mirror 32 without applying any excessive stress to the polygon mirror 32.

A permanent magnet 37 which faces the magnet coil 22 and generates a running torque is bonded with an adhesive to the lower portion of the mirror press plate 35.

The mirror unit 30 is comprised of the flange member 31, polygon mirror 32, external cylinder bearing 33, leaf spring 34, mirror press plate 35, machine screw 36, and permanent magnet 37.

A shaft 20a stands at the center of the base member 20. A lower thrust bearing 24 and upper thrust bearing 26 are fitted on the shaft 20a at an interval along the axis of the shaft 20a. An, internal cylinder bearing 25 is fitted on the shaft 20a between the lower thrust bearing 24 and upper thrust bearing 26 of the shaft 20a. The external cylinder bearing 33 of the mirror unit 30 is fitted on the internal cylinder bearing 25, and fixed to the shaft 20a by threadably fixing a machine screw 28 extending through a plate 27 to the shaft 20a. The internal cylinder bearing 25, external cylinder bearing 33, lower thrust bearing 24, and upper thrust bearing 26 are formed of alumina or ceramic (e.g., silicon nitride).

The external cylinder bearing 33 which holds the mirror unit 30 performs radial dynamic-pressure rotation on a radial bearing formed by the internal cylinder bearing 25, and thrust dynamic-pressure rotation on a thrust bearing formed by the lower thrust bearing 24 and upper thrust bearing 26. A dynamic-pressure generation groove is formed in at least any one of the bearing surface of the lower thrust bearing 24, the bearing surface of the upper thrust bearing 26, and the outer surface of the internal cylinder bearing 25. A wind generated upon high-speed rotation flows into the dynamic-pressure generation groove. A strong wind pressure generated in the dynamic-pressure generation groove forms a gap of about 3 to 10 $\mu$m between each fixed bearing and the external cylinder bearing 33, decreasing the resistance between these bearings. The mirror unit 30 can smoothly rotate at high speed in a non-contact state.

The optical deflection device is formed in the above way. High-speed rotation of the mirror unit 30 generates a harsh wind sound due to disturbance of the air flow or noise due to vibrations. In particular, an office or the like in which quietness is necessary must take any measure for silence. It is therefore desirable to employ a cover facing the base member 20 and cover the mirror unit 30 and the like. A cover as disclosed in Japanese Unexamined Patent Publication No. 11-84296 may be arranged.

Figure 4:
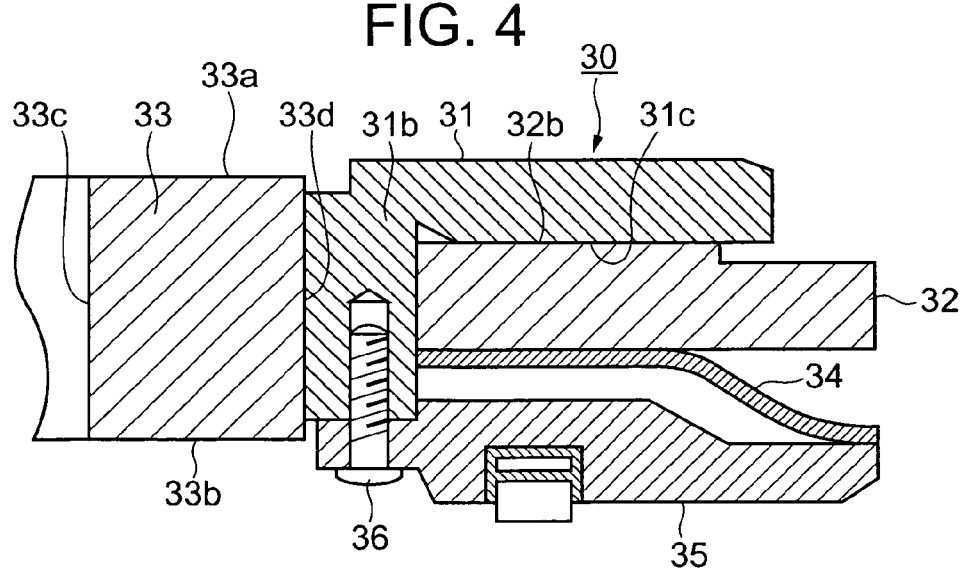
FIG. 4 is an enlarged sectional view showing a mirror unit.
Figure 5:
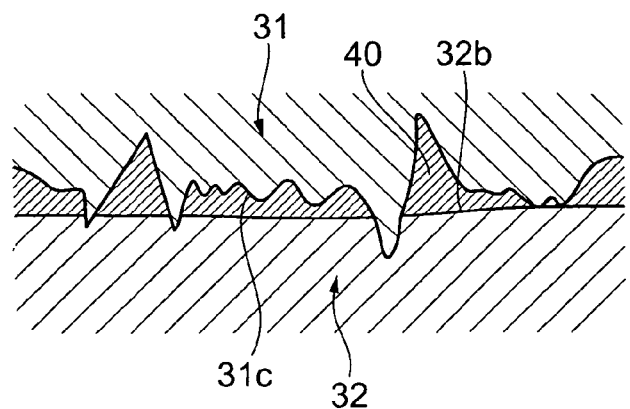
FIG. 5 is an enlarged view showing the contact between the holding surface of a flange member and the held surface of a polygon mirror.

A method of manufacturing the mirror unit 30 will be explained with reference to FIGS. 4 and 5. FIG. 4 is an enlarged sectional view showing the mirror unit 30. FIG. 5 is an enlarged view showing the contact between the holding surface 31c of the flange member 31 and the held surface 32b of the polygon mirror 32.

The external cylinder bearing 33 is mirror-finish such that an upper end face 33a and lower end face 33b form right angles with the central axis, and an inner surface 33c and outer surface 33d become concentric with the central axis. The external cylinder bearing 33 is integrally fitted by shrink fitting or press fitting in the central hole of the flange member 31.

The holding surface 31c of the flange member 31 undergoes flat work using the upper end face 33a or lower end face 33b of the external cylinder bearing 33 as a reference so as to become parallel to the upper end face 33a and lower end face 33b. As a result, the holding surface 31c perpendicular to the axis of rotation of the external cylinder bearing 33 can be attained.

After the flange member 31 except the holding surface 31c is masked, the holding surface 31c is subjected to surface roughening such as abrasive blasting, and processed into a rough surface.

An adhesive is applied to the holding surface 31c of the flange member 31, and the polygon mirror 32 is fitted on the cylindrical portion 31b of the flange member 31. The held surface 32b of the polygon mirror 32 is press-bonded to the holding surface 31c of the flange member 31. In some cases, the adhesive may be applied to the held surface 32b of the polygon mirror 32.

The leaf spring 34 is inserted into the cylindrical portion 31b of the flange member 31, and the mirror press plate 35 is fastened and fixed to the cylindrical portion 31b of the flange member 31 by the machine screw 36. If the adhesive is applied to the contact between the mirror press plate 35 and the cylindrical portion 31b of the flange member 31, the mirror press plate 35 is more firmly fixed to the flange member 31.

Consequently, the held surface 32b of the polygon mirror 32 is pressed against the holding surface 31c of the flange member 31 by the leaf spring 34. As shown in FIG. 5, projections formed by abrasive blasting on the holding surface 31c catch into the held surface 32b, and an adhesive 40 flows into recesses formed by abrasive blasting on the holding surface 31c.

The contact between the holding surface 31c of the flange member 31 and the held surface 32b of the polygon mirror 32 is very firm. Even if the polygon mirror 32 rotates at a very high speed of 50,000 rpm or more, the polygon mirror 32 does not shift from the flange member 31, and satisfactory durability can be obtained.

The same effects can also be achieved when not the flange member 31 but the held surface 32b of the polygon mirror 32 undergoes abrasive blasting in the above manufacturing method.

Abrasive blasting may also be performed for both the holding surface 31c and held surface 32b.

In addition, the holding surface 31c of the flange member 31 may be processed into a rough surface by cutting instead of mirror finish.

The influence of a change in the rough surface of the holding surface 31c of the flange member 31 on an initial face tangle angle (inclination of the polygon mirror from the axis of rotation) and vibration change (balance) will be explained on the basis of Table 1.

TABLE 1

| | Flange Surface Roughening | | Initial | Vibration Change at 60 krpm |
|---|---|---|---|---|
| | Method | Ry ($\mu$m) | Face Tangle Angle (sec) | After 1,000 h (m/s$^2$) |
| ① | Form rolling (embossing) | 32 | 230 | 0.5 |
| ② | Blasting: abrasive grain #80 | 19.6 | 65 | 0.3 |
| ③ | Blasting: abrasive grain #150 | 7.1 | 34 | 0.3 |
| ④ | Blasting: abrasive grain #230 | 6.7 | 40 | 0.5 |
| ⑤ | Blasting: abrasive grain #400 | 4.7 | 29 | 0.6 |
| ⑥ | Blasting: abrasive grain #800 | 3.0 | 38 | 0.3 |
| ⑦ | Cutting | 1.3 | 42 | 2.5 |
| ⑧ | Cutting | 0.3 | 33 | 3.1 |
| ⑨ | Mirror surface cutting | <0.1 | 36 | 2.2 |

Table 1 exhibits nine flange members which were formed by surface roughening according to various methods and had different rough surfaces. After the surface roughness Ry ($\mu$m) of each flange member was measured, the flange member was assembled into a polygon mirror unit by the above-described method. The initial face tangle angle (sec) of the polygon mirror and the vibration change (m/s$^2$) upon rotation at 60,000 rpm for 1,000 h were measured. The surface roughness (Ry) before surface roughening was a mirror surface roughness of 0.1 $\mu$m or less, and the adhesive used to bond the polygon mirror was Cemedine Super X. The number of samples was 10 for each polygon mirror, and each value was a mean value.

Flange member ① by form rolling had an excessively rough processed surface, and the polygon mirror greatly inclined. Flange members ⑦ to ⑨ by cutting into a mirror surface or almost the mirror surface did not have any projection regardless of abrasive blasting, and no adhesive entered the bonded surface. Only simple bonding between flat surfaces could not suppress a positional error of the polygon mirror. For practical use, the initial face tangle angle of the polygon mirror is desirably 150 sec or less, and the vibration change is 2 m/s$^2$ or less.

Flange members ② to ⑥ by abrasive blasting were found preferable with small face tangle angles and small vibration changes.

Hence, the flange member is desirably so processed as to set the surface roughness of the holding surface of the flange member to 3 $\mu$m≦Ry≦20 $\mu$m.

Note that Ry is a maximum height defined by JIS B0601, and is a value obtained by extracting a profile by only the reference length along the mean line from the roughness profile and measuring the spacing between the peak line and the valley line of the extracted part in the direction of the longitudinal magnification of the roughness profile.

The influence on the vibration change (balance) upon changing the adhesive used to bond the holding surface 31c of the flange member 31 and the held surface 32b of the polygon mirror 32 and the flatness of the reflecting surface 32a of the polygon mirror 32 upon assembly into the polygon mirror unit 30 will be explained on the basis of Table 2.

TABLE 2

| | Adhesive Type | Young's Modulus at 25° C. (MPa) | Vibration Change at 60 krpm After 1,000 h (m/s$^2$) | Mirror Flatness After Assembly ($\lambda$ = 633 nm) |
|---|---|---|---|---|
| ① | Super X (available from Cemedine) | 20 | 0.5 | $\lambda$/5 |
| ② | L/T366 (available from Loctite) | 1220 | 0.4 | $\lambda$/4 |
| ③ | L/T344 (available from Loctite) | 1400 | 0.3 | $\lambda$/4 |
| ④ | DP-190G (available from Sumitomo 3M) | 2330 | 0.4 | $\lambda$/2 to $\lambda$ |

Table 2 represents the use of four types of adhesives. After the Young's modulus (MPa) was measured for each adhesive, the flange member was assembled into a polygon mirror Unit 30 by the above-described method. The vibration change (m/s$^2$) upon rotation at 60,000 rpm for 1,000 h and the flatness of the reflecting surface of the polygon mirror were measured. The surface roughness (Ry) before surface roughening was, a mirror surface roughness of 0.1 $\mu$m or less, the surface roughness (Ry) of the holding surface of the flange member was 6.7 $\mu$m (abrasive blasting: abrasive grain #230), and the adhesive was cured at 80° C. after assembly. The number of samples was 10 for each polygon mirror, and each value was a mean value.

The vibration change was preferably 2 m/s$^2$ or less for each flange member. The flatness of the polygon mirror was as low as $\lambda$/4 or more for adhesive ④, but both the vibration change and flatness were good for adhesives ① to ③. Adhesives ① to ③ were flexible and deformed to prevent shrinkage upon curing the adhesive or thermal deformation of the flange member from transmitting to the reflecting surface of the polygon mirror. As a result, the flatness of the reflecting surface was kept high.

From this, an adhesive having a Young's modulus of 1,700 Mpa or less, and more preferably 1,144 MPa or less at room temperature (25° C.) is desirably adopted.

What is claimed is:

1. An optical deflection device comprising:
    a base member;
    a polygon mirror which is formed into a regular polygon and has a reflecting surface on each peripheral end face;
    a flange member which holds said polygon mirror and rotates with respect to said base member; and
    a press member which presses said polygon mirror against said flange member,
    wherein surface roughening is performed for at least one of a holding surface of said flange member which holds said polygon mirror and a held surface of said polygon mirror which is held by the holding surface, and the holding surface and the held surface are bonded with an adhesive,
    wherein a surface roughness (Ry) of the holding surface and/or the held surface having undergone surface roughening satisfies a conditional expression:

3 $\mu$m≦Ry≦20 $\mu$m where Ry: maximum height (JIS B0601), and
    wherein the adhesive has a Young's modulus of not more than 1700 MPa at 25° C.

2. An apparatus according to claim 1, wherein the surface roughening includes abrasive blasting.

3. An apparatus according to claim 1, wherein the adhesive has a Young's modulus of not more than 1,114 MPa at 25° C.

4. An apparatus according to claim 1, wherein said polygon mirror is rotated at a rotational speed of not less than 50,000 rpm.

5. An image printing apparatus comprising an optical deflection device defined in claim 1.

6. An apparatus according to claim 1, wherein said polygon mirror and said flange member are formed from aluminum.

7. An optical deflection device manufacturing method comprising the steps of:

integrally fitting a flange member on a bearing;

performing flat work for a holding surface of the flange member arranged to hold a polygon mirror having a plurality of reflecting surfaces so as to become a surface perpendicular to an axis of rotation of the bearing;

performing surface roughening for the holding surface of the flange member;

applying an adhesive between the holding surface of the flange member and a held surface of the polygon mirror held by the holding surface; and mounting a press member which presses and biases the polygon mirror against the flange member, wherein a surface roughness (Ry) of the holding surface having undergone surface roughening satisfies a conditional expression:

$$3\ \mu m \leq Ry \leq 20 \mu m$$

where Ry: maximum height (JIS B0601), and wherein the adhesive has a Young's modulus of not more than 1700 MPa at 25° C.

8. A method according to claim 7, wherein the surface roughening includes abrasive blasting.

9. A method according to claim 7, wherein the adhesive has a Young's modulus of not more than 1,144 HPa at 25° C.

10. A method according to claim 7, wherein the polygon mirror is rotated at a rotational speed of not less than 50,000 rpm.

11. An optical deflection device manufacturing method comprising the steps of:

integrally fitting a flange member on a bearing;

performing flat work for a holding surface of the flange member arranged to hold a polygon mirror on a held surface of the polygon mirror, the polygon mirror having a plurality of reflecting surfaces so as to become a surface perpendicular to an axis of rotation of the bearing;

performing surface roughening for the held surface of the polygon mirror;

applying an adhesive between the holding surface of the flange member and the held surface of the polygon mirror held by the holding surface; and mounting a press member which presses and biases the polygon mirror against the flange member, wherein a surface roughness (Ry) of the held surface having undergone surface roughening satisfies a conditional expression:

$$3\ \mu m \leq Ry \leq 20\ \mu m$$

where Ry: maximum height (JIS B0601), and wherein the adhesive has a Young's modulus of not more than 1700 MPa at 25° C.

12. A method according to claim 11, wherein the surface roughening includes abrasive blasting.

13. A method according to claim 11, wherein the adhesive has a Young's modulus of not more than 1,114 MPa at 25° C.

14. A method according to claim 11, wherein the polygon mirror is rotated at a rotational speed of not less than 50,000 rpm.

* * * * *